(12) United States Patent
Marx et al.

(10) Patent No.: US 6,988,454 B2
(45) Date of Patent: Jan. 24, 2006

(54) METHOD AND APPARATUS FOR ADDING REDUCING AGENT TO SECONDARY OVERFIRE AIR STREAM

(75) Inventors: Peter D. Marx, Hooksett, NH (US); Robert W. Pickering, Concord, NH (US); Charles E. Trippel, Marlborough, CT (US)

(73) Assignee: Advanced Combustion Technology, Hooksett, NH (US)

( * ) Notice: Subject to any disclaimer, the term of this patent is extended or adjusted under 35 U.S.C. 154(b) by 0 days.

(21) Appl. No.: 10/936,289

(22) Filed: Sep. 8, 2004

(65) Prior Publication Data

US 2005/0051067 A1 Mar. 10, 2005

Related U.S. Application Data

(60) Provisional application No. 60/501,452, filed on Sep. 9, 2003.

(51) Int. Cl.
*F23B 5/00* (2006.01)
*F23G 7/06* (2006.01)

(52) U.S. Cl. .................. 110/345; 110/214
(58) Field of Classification Search ........... 110/345, 110/347, 210, 214, 203; 431/10
See application file for complete search history.

(56) References Cited

U.S. PATENT DOCUMENTS

| | | | |
|---|---|---|---|
| 4,902,488 A | | 2/1990 | Epperly et al. |
| 5,048,431 A | * | 9/1991 | Landreth et al. ............ 110/343 |
| 5,237,939 A | * | 8/1993 | Spokoyny et al. .......... 110/345 |
| 5,536,482 A | * | 7/1996 | Diep et al. .................. 423/235 |
| 5,681,536 A | * | 10/1997 | Swoboda et al. ........... 422/168 |
| 6,280,695 B1 | | 8/2001 | Lissianski et al. |
| 6,865,994 B2 | * | 3/2005 | Seeker et al. ............... 110/345 |

* cited by examiner

*Primary Examiner*—Kenneth Rinehart
(74) *Attorney, Agent, or Firm*—Davis & Bujold, P.L.L.C.

(57) ABSTRACT

A combustion boiler for burning fuel and producing heat to generate steam. A method of minimizing discharging of nitrogen oxides from a combustion boiler comprising the steps of spraying a reducing agent into an overfire air stream and supplying the overfire air stream to the combustion boiler. Vaporizing the sprayed reducing agent at least within about 0.1 seconds of the sprayed reducing agent entering the combustion boiler and reacting the vaporized reducing agent with the nitrogen oxides within the combustion chamber to reduce the nitrogen oxides and minimize discharge of nitrogen oxides from the combustion boiler. The reducing agent is nearly substantially instantaneous evaporated/gasified by the high energy of the reducing agent injection system.

18 Claims, 7 Drawing Sheets

US 6,988,454 B2

METHOD AND APPARATUS FOR ADDING REDUCING AGENT TO SECONDARY OVERFIRE AIR STREAM

This application claims the benefit of provisional application No. 60/501,452 filed Sep. 9, 2003.

FIELD OF THE INVENTION

The present invention relates to a combustion boiler having a reducing agent added to an overfire air stream such that the reducing agent is nearly substantially instantaneous evaporated/gasified by the high energy of the reducing agent injection system. The present invention also relates to a combustion boiler having at least one initial overfire air duct partitioned into an initial primary overfire air stream and an initial secondary overfire air stream, with a reducing agent being only added to the initial secondary overfire air stream but not to the initial primary overfire air stream.

BACKGROUND OF THE INVENTION

It is known in the prior art to add a reducing agent, such as ammonia for example, to the combustion byproducts within a combustion boiler prior to the combustion byproducts exiting from the combustion boiler in order to reduce the amount of nitrogen oxides remaining in the exhaust stream as the exhaust stream leaves an exit section of the combustion boiler. The reducing agent is generally dispersed in the upper region of the combustion boiler and allowed to react with the combustion byproducts prior to the combustion byproducts exiting via the exit section. One method of applying a reducing agent to the combustion byproducts of a combustion boiler is disclosed in U.S. Pat. No. 4,902,488 while an alternative method is disclosed in U.S. Pat. No. 6,280,695.

As used in the specification and the appending claims, the terms "nitrogen oxides" and "$NO_x$" are used interchangeably to refer to the nitric oxide (NO) and the nitrogen dioxide ($NO_2$) chemical species. Other oxides of nitrogen, such as $N_2O$, $N_2O_3$, $N_2O_4$ and $N_2O_5$, are known but these species are not emitted in significant quantities from stationary combustion sources (except for possible $N_2O$). Thus, while the term "nitrogen oxides" can be used more generally to encompass all binary N—O compounds, it is used herein to refer in particular to the NO and $NO_2$ (e.g., $NO_x$ species).

While it is known to apply a reducing agent to the combustion byproducts prior to the combustion byproducts leaving the exit section of the combustion boiler, the prior art methods heretofore have not achieved a maximum reduction in the amount of nitrogen oxides contained within the exhaust stream while also minimizing usage of the reducing agent.

Moreover, while it is generally known, according to U.S. Pat. No. 6,280,695, to inject a reducing agent through overfire air ports into a combustion boiler, this known technique creates reducing agent droplets or particles of a sufficient large size and sufficiently shields the reducing agent droplets in the overfire air stream to delay evaporation and/or gasification of the same so that the lifetime of the reducing agent droplets or particles is greater than the overfire air mixing time with the combustion flue gases. While this technique may reduce somewhat the discharge of nitrogen oxides, a still further reduction in the amount of nitrogen oxides contained within the exhaust stream is required while also minimizing usage of the reducing agent.

SUMMARY OF THE INVENTION

Wherefore, it is an object of the present invention to overcome the above noted drawbacks associated with the prior art systems.

Another object of the present invention is to provide a combustion boiler and associated method for reducing the amount of nitrogen oxides contained in the exhaust stream of the combustion boiler as that exhaust stream leaves the exit section of the combustion boiler.

A further object of the present invention is to evaporate, gasify and/or vaporize the reducing agent, within an air overfire stream, to ensure that the gasified or vaporized reducing agent intimately, rapidly and quickly reacts with the combustion byproducts, prior to the combustion byproducts exiting the combustion boiler, to maximize the amount of reduction of the combustion byproducts occurring within the combustion boiler and minimize the amount of nitrogen oxides, and other harmful byproducts contained within the exhaust stream, exiting from the combustion boiler.

Yet another object of the present invention is 1) to provide an excess quantity of oxygen, via initial primary and secondary overfire air streams, to the combustion area to insure that virtually all of the fuel supply to the combustion boiler is totally and completely consumed while, at the same time, 2) to provide an ample supply of the reducing agent, via the initial secondary stream air stream, to maximize reduction of the nitrogen oxides contained in the exhaust immediately prior to the exhaust stream exiting from the combustion boiler via the exit section.

A still further object of the present invention is to divide the initial overfire air stream into two separate streams, with the initial primary overfire air stream being exclusively overfire air, i.e., no reducing agent is added or mixed therewith, and the initial primary overfire air stream is designed to surround, encase and/or envelope the fuel and combustion components supplied to the combustion boiler to ensure complete combustion thereof. The initial primary overfire air stream supplies additional oxygen to the fuel combustion components, of the combustion boiler, to facilitate substantially complete combustion and consumption of substantially all of the fuel combustion components prior to the combustion byproducts exiting from the combustion boiler. The initial secondary overfire air stream contains a vaporized, evaporated, and/or gaseous reducing agent, along with additional oxygen, which surrounds, encases and/or envelopes both the initial primary overfire air stream and the fuel components so as to maximize reduction of the nitrogen oxides exhausted from the combustion boiler.

Yet another object of the present invention is to supply the reducing agent, in liquid form, to a heated initial secondary overfire air stream so that the energy and/or heat from the heated initial secondary overfire air stream substantially instantaneously vaporizes, evaporates, and/or gasifies the liquid reducing agent to enhance the reduction of the nitrogen oxides contained within the combustion boiler.

A still further object of the present invention is to supply the reducing agent, in liquid form, to an overfire air stream and sufficiently intermix the liquid reducing agent with the overfire air stream so that the liquid reducing agent is sheared and further broken down into smaller particles which are rapidly heated and/or absorb energy from the overfire air stream so as to be substantially instantaneously vaporized or gasified either immediately upon, or shortly after, entering into the combustion boiler, i.e., the liquid reducing agent is substantially completely evaporated or gasified within 0.01 seconds after entering into the combustion boiler, so that the vaporized or gasified reducing agent is immediately available to react with any nitrogen oxide(s) contained within the combustion boiler.

Another object is to prevent the liquid reducing agent from collecting or combining with one another to form larger droplets which will not substantially instantaneously vaporize or gasified upon entering into the combustion boiler, i.e., within 0.01 seconds after entering into the combustion boiler, and be immediately available for reaction with any nitrogen oxide(s) contained within the combustion boiler.

The present invention also relates to a method of minimizing discharge of nitrogen oxides from a combustion boiler, the method comprising the steps of: spraying a reducing agent into an overfire air stream; supplying the overfire air stream with the sprayed reducing agent to the combustion boiler; vaporizing the sprayed reducing agent at least within about 0.1 seconds of the sprayed reducing agent entering the combustion boiler; and reacting the vaporized reducing agent with the nitrogen oxides within the combustion chamber to reduce the nitrogen oxides and minimize discharge of nitrogen oxides from the combustion boiler.

The present invention also relates to a combustion boiler for combusting fuel and generating heat, the combustion boiler comprising: a housing defining an internal combustion chamber therein; at least one fuel supply duct connected to the combustion boiler for supplying fuel to the combustion chamber; and at least one initial overfire air duct for supplying an initial overfire air stream to the combustion chamber to facilitate complete combustion of the fuel supplied to the combustion boiler; wherein the at least one initial overfire air duct is divided into an initial primary overfire air stream and an initial secondary initial overfire air stream, and a reducing agent is added only to the initial secondary initial overfire air stream, but not the initial primary initial overfire air stream, prior to the secondary initial overfire air stream discharging into the combustion chamber.

BRIEF DESCRIPTION OF THE DRAWINGS

The invention will now be described, by way of example, with reference to the accompanying drawings in which.

DETAILED DESCRIPTION OF THE INVENTION

Figure 1:
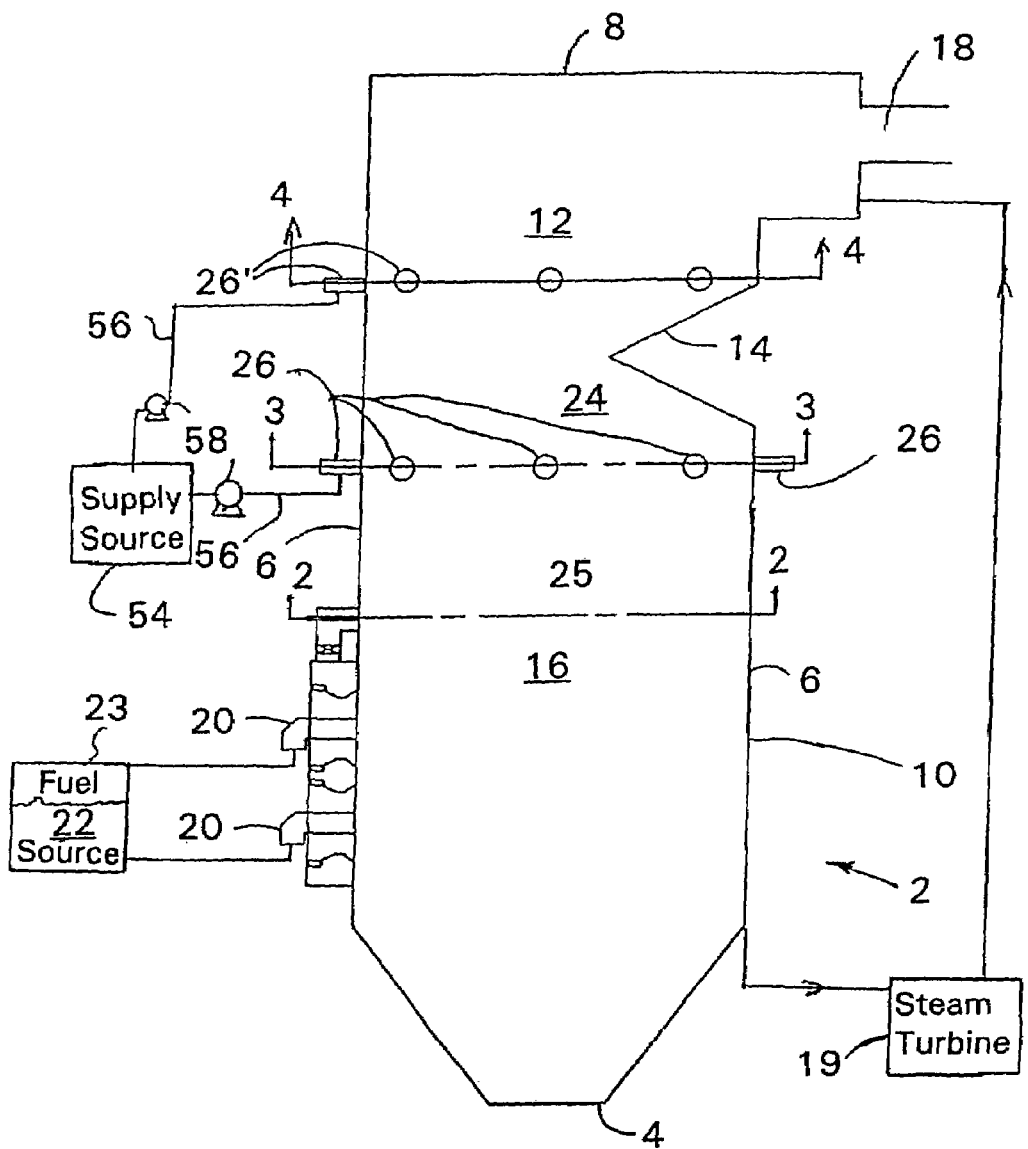
FIG. 1 is a diagrammatic view of an improved combustion boiler according to the present invention.

Turning now to the Figures, a brief description concerning a combustion boiler will first be provided and this will be followed by a detailed description of the present invention. As can be seen in those Figures, the combustion boiler is generally designated with reference numeral number 2. The combustion boiler 2 includes a base wall 4 and a sidewall, e.g., generally four planar sidewalls, as well as a top wall 8. The base wall 4, the four sidewalls 6 and the top wall 8 define an enclosed housing 10 of the combustion boiler 2. An inwardly tapering indentation 14 is formed in the rear sidewall 6 of the enclosed housing 10 and this inwardly tapering indentation 14 forms a constriction or a throat in the combustion boiler 2 that accelerates the combustion byproducts as they flow from a primary combustion chamber 16 into the secondary combustion chamber 12. Finally, an exit section 18 is formed in one of the sidewalls 6 of the combustion boiler 2, above the inwardly tapering indentation 14 and adjacent the top wall 8. The exit section 18 generally conveys the combustion byproducts of the combustion boiler 2 to a further treatment apparatus or system, as is well known in the art, prior to discharging such combustion byproducts into the atmosphere. Since the further treating of the combustion byproducts prior to discharging the same into the atmosphere is well known in the art and per se forms no part of the present invention, a further discussion concerning the same is not provided.

As only diagrammatically shown in FIG. 1 of the drawings, each one of the sidewalls 6 of the combustion boiler 2 includes an internal array of a plurality of longitudinally arranged parallel conduits or pipes which facilitate the flow of a cooling fluid, e.g., cooling water, through the sidewalls 6 to remove heat thereform. The plurality of longitudinally arranged parallel conduits or pipes generally extend from adjacent the top wall 8 to adjacent the base wall 4. The cooling fluid is supplied to inlet(s) coupled to the plurality of longitudinally arranged parallel conduits or pipes and flows therethrough to absorb and remove heat generated within the primary and secondary combustion chambers 16, 12 and absorbed by the sidewall 6 of the combustion boiler 2. The heated fluid is then discharged, via a cooling fluid outlet(s) coupled thereto, and this heat fluid is typically used to drive a steam turbine 19 (only diagrammatically shown in FIG. 1), for example, and generate electricity in a conventional manner.

At least one sidewall 6, a pair of opposed sidewalls 6, or possibly one or more corners of the boiler is provided with at least one, preferably a plurality of fuel supply duct(s) 20 which supply a desired fuel 22, e.g., finely ground coal, oil, gas, etc., mixed with an ample supply of oxygen, from a fuel supply source 23 to the combustion boiler 2. As shown in FIG. 1, two rows of fuel supply duct(s) 20 may be utilized for supplying fuel 22 to the combustion boiler 2. The supplied fuel 22 is discharged by an outlet of each one of the fuel supply duct(s) 20 into the combustion boiler 2 toward a rear side of a lower region of the primary combustion chamber 16 where the discharged fuel 22 rapidly ignites and is consumed. Generally, a high level of nitrogen oxides and carbon monoxide are generated as the fuel is consumed and the nitrogen oxides and carbon monoxide have a tendency to collect adjacent the rear surface of the combustion boiler 2. Alternatively, one or more rows of fuel supply duct(s) 20 may be provided along an opposed sidewall 6 so that the supplied fuel from the facing fuel supply ducts 20 intermix with one another in a central area of the primary combustion chamber 16. This arrangement generally results in a high level of nitrogen oxides and carbon monoxide in the central area of the combustion boiler 2.

The combustion boiler 2 typically operates at very high temperatures, e.g., between 2,800° and 3,300° F., and, as a result of such temperatures, the fuel 22 is substantially instantaneously consumed as it enters into the primary combustion chamber 16 of the combustion boiler 2. The combustion byproducts, resulting from combustion of the fuel 22, flow upward through the combustion boiler 2 due to their elevated temperature.

As is well known in the art, the combustion byproducts resulting from the combustion of the fuel 22 generates nitrogen oxides which is harmful to the environment and must be eliminated, as much as possible, prior to exhausting the combustion byproducts into the atmosphere. Carbon monoxide is also generated as a byproduct. To facilitate a reduction or conversion of the nitrogen oxides into relatively harmless compositions (such as $N_2$ and $H_2O$, for example), a reducing agent 34 is typically supplied to an upper region 24, located adjacent to but below the inwardly tapering indentation 14, of the primary combustion chamber 16 of the combustion boiler 2. The reducing agent 34 reduces the nitrogen oxides to $N_2$ and $H_2O$, and a further discussion concerning the same will follow. Preferably, the reducing agent 34 is a mixture of water and one or more concentrated reducing agents. The one or more concentrated reducing agent(s) is/are mixed with the water at a ratio of about 3% to 15% of concentrated reducing agent to about 85% to 97% water. Examples of suitable concentrated reducing agents 34 for use with the present invention and which are well known in the art are, for example, ammonia, ammonia salts, urea and urea prills.

Figure 3:
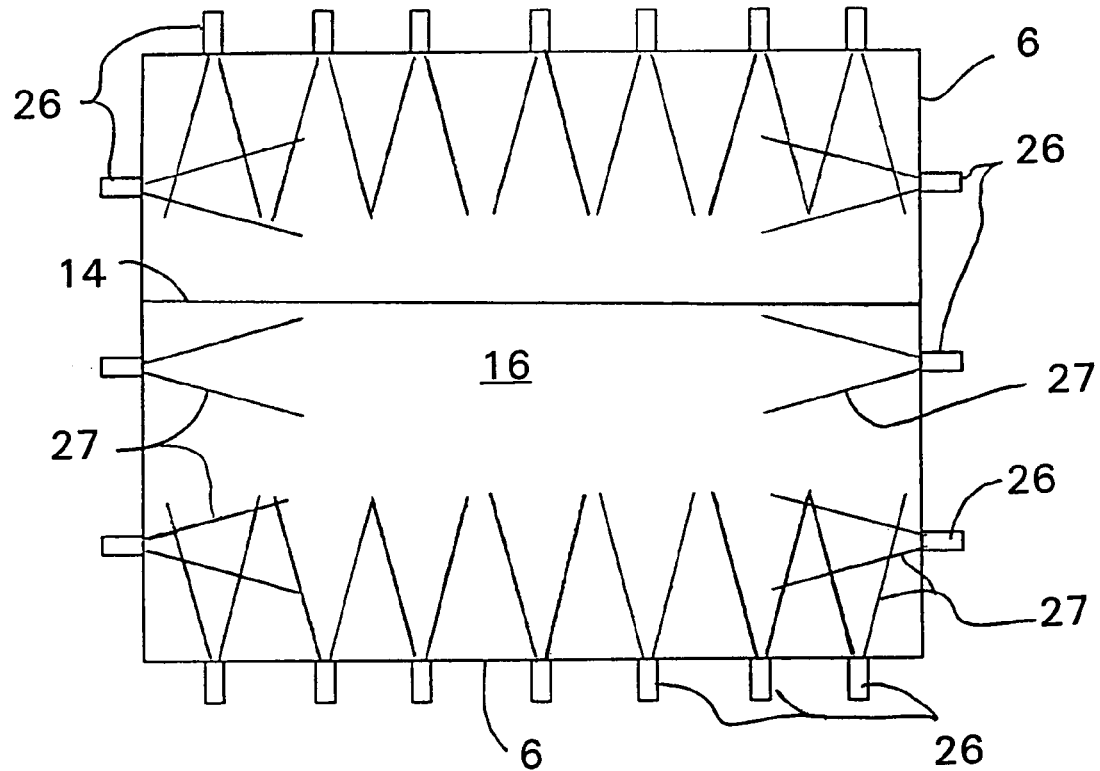
FIG. 3 is a diagrammatic cross-sectional view of the combustion boiler, taken along section line 3—3 of FIG. 1, showing a plurality of primary combustion chamber overfire air ducts.
Figure 4:
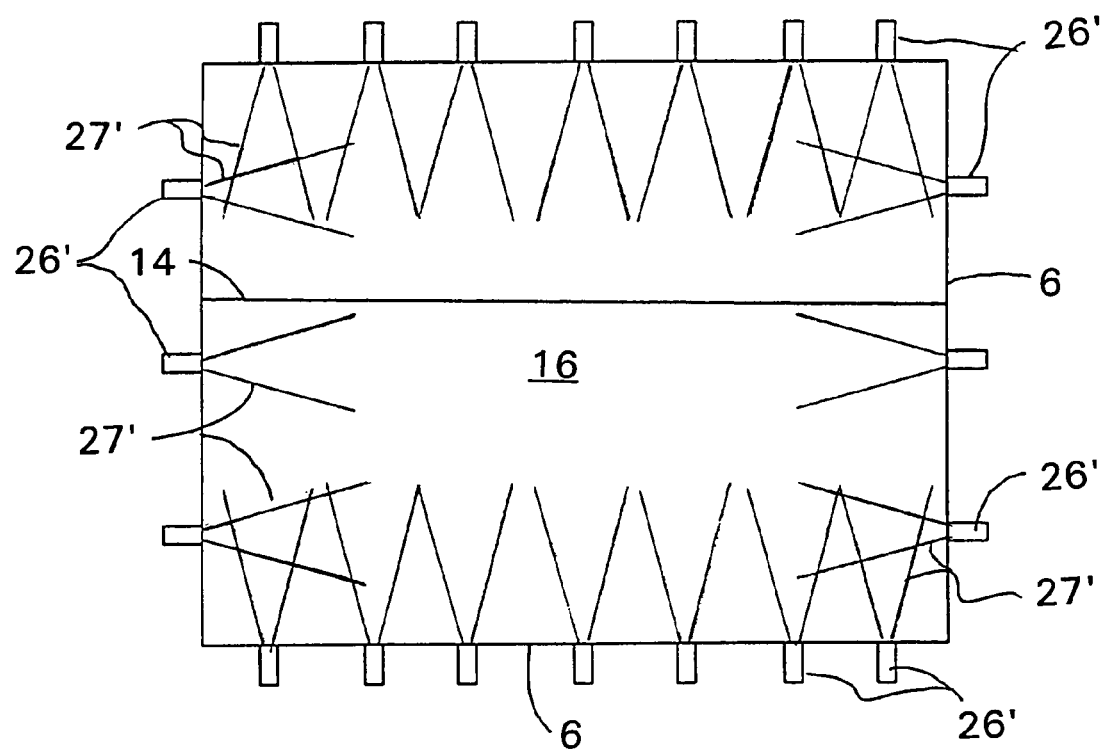
FIG. 4 is a diagrammatic cross-sectional view of the combustion boiler, taken along section line 4—4 of FIG. 1, showing a plurality of secondary combustion chamber overfire air ducts.

The present invention, like other prior art combustion boilers, may include a plurality of Selective Non-Catalytic Reduction (SNCR) ducts 26 and 26' (see FIGS. 1 and 3) which are typically equally spaced about a perimeter or periphery of the housing 10 to supply additional air, e.g., oxygen, as well as a reducing agent 34 to the upper most region 24 of the primary combustion chamber 16 of the combustion boiler 2. Preferably, there are two sets of SNCR ducts, namely, a lower set of primary SNCR ducts 26 and an upper set of secondary SNCR duct 26'. Each of these SNCR ducts 26, 26' directs a SNCR stream 27 or 27', respectively (FIG. 3 and 4), into the upper most region 24 of the primary combustion chamber 16 of the combustion boiler 2. These SNCR streams 27 and 27' insure that there is ample supply of oxygen and the reducing agent 34 to facilitate substantially full and complete consumption of all of the fuel 22 supplied by the fuel duct(s) 20 to the interior of the combustion boiler 2.

The primary SNCR stream 27 encases and envelopes the central area of the upper most region 24 of the primary combustion chamber 16 and surrounds the fuel 22 emitted by the fuel supply ducts 20. The primary SNCR stream 27 generally flows at a rate of between 50 to 200 ft/sec, depending on the depth of the boiler, and is typically designed to envelope the fuel 22 emitted by the fuel supply ducts and assist with substantially full and complete combustion of all of the fuel 22 prior to the combustion byproducts being exhausted out through the exit section 18 of the combustion boiler 2. The flow rate of the primary SNCR stream 27 will also allow the reducing agent to flow towards the rear side wall and spread evenly within the rear third of the furnace. This distribution of reducing agent within the primary SNCR stream 27 will allow for maximum distribution of the reducing agent within the furnace with a minimum number of injectors. The reducing agent is generally completely vaporized well before primary SNCR stream carries the reducing agent towards the rear sidewall of the combustion boiler and more preferably the reducing agent is completely vaporized about midway between the front sidewall and the rear sidewall.

Figure 5:
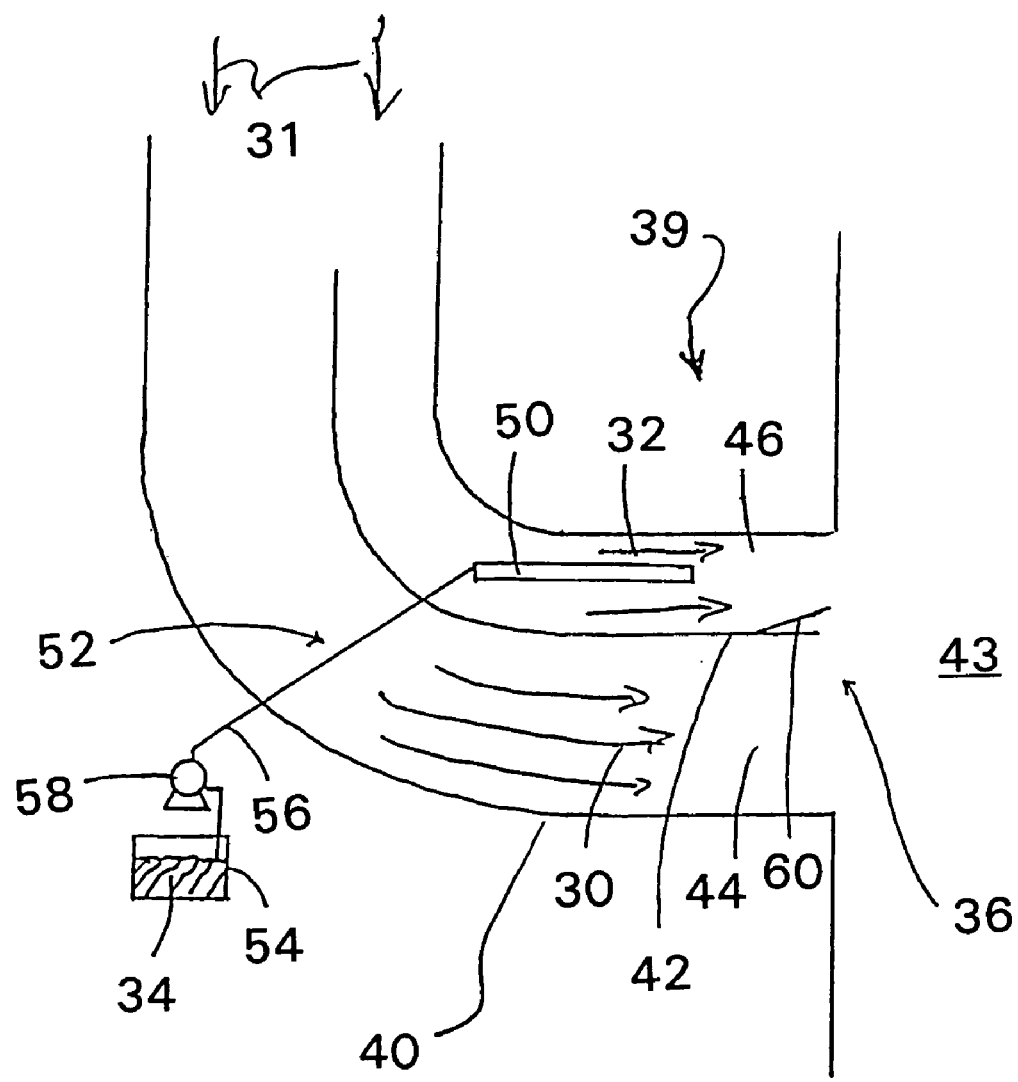
FIG. 5 is a diagrammatic cross-sectional view on one of the initial overfire air ducts according to the present invention.

Preferably, the primary SNCR stream 27 is supplied at an elevated temperature, e.g., at a temperature of between about 300° to 800° F. and more preferably between about 400° and 700° F., so that the primary SNCR stream 27 ensures that the reducing agent 34, added thereto, is vaporized and converted into a gaseous phase or state substantially instantaneously as the reducing agent 34 is mixed with the primary SNCR stream 27 and enters a flue gas/reducing agent mixing zone 43 into upper most region 24 of the primary combustion chamber 16 (see FIG. 5).

Alternatively, it is possible that the primary SNCR stream 27 may be either room or external air which is supplied at ambient temperature, e.g., −50° F. to 120° F. for example depending upon the temperature of the ambient air. According to this embodiment, the reducing agent 34 is generally only vaporized and converted into a gaseous phase or state substantially instantaneously upon the reducing agent 34 entering into and mixing with the gases of combustion chamber 16.

Figure 2:
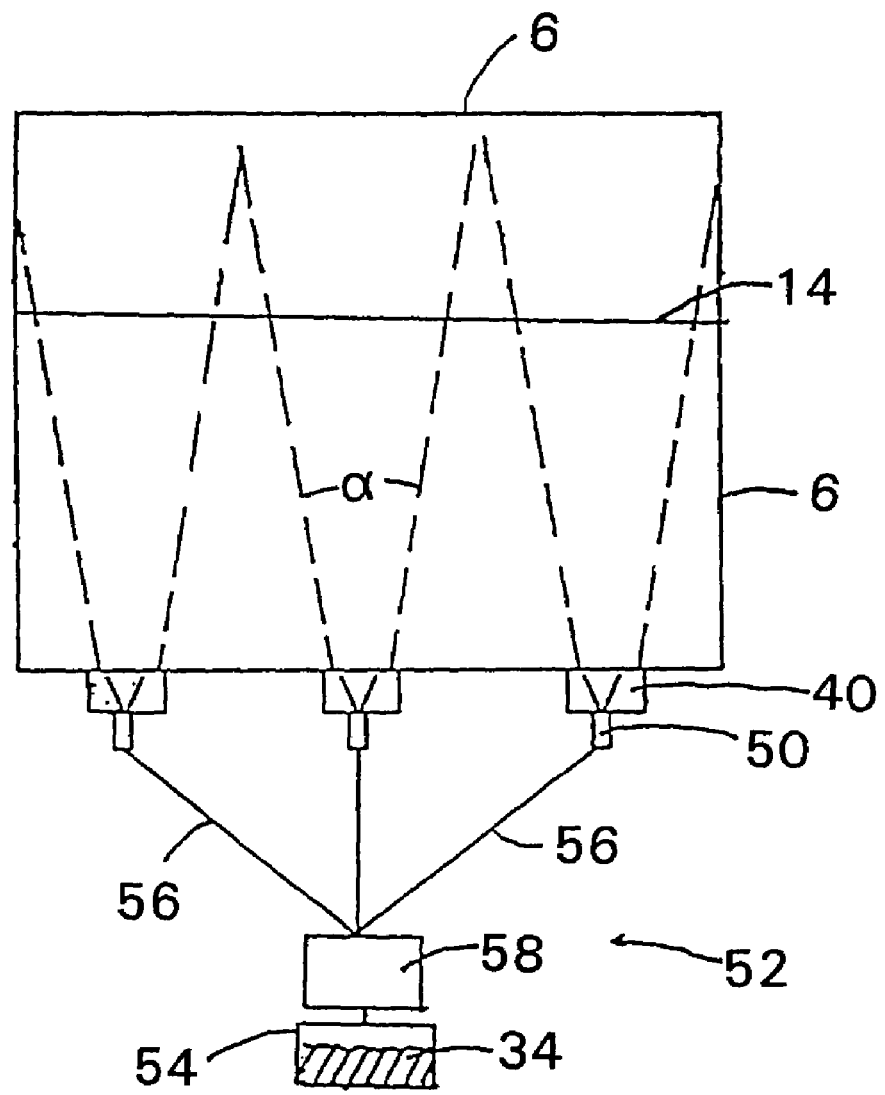
FIG. 2 is a diagrammatic cross-sectional view of the combustion boiler, taken along section line 2—2 of FIG. 1, showing a plurality of initial overfire air ducts.
Figure 2A:
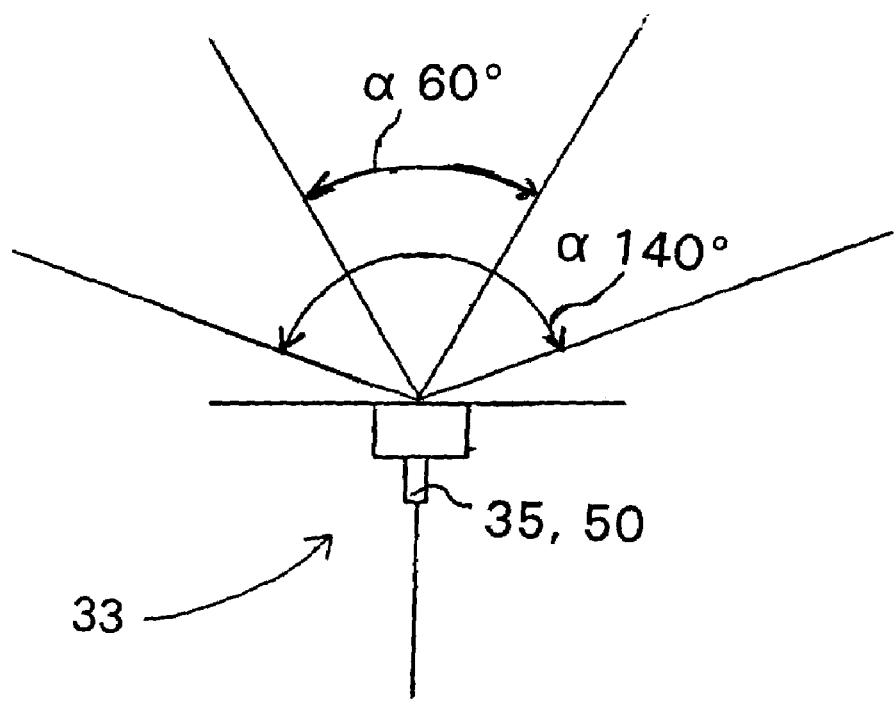
FIG. 2A shows the injection device having a spray discharge angle α ranging from about 60° to about 140°.
Figure 6:
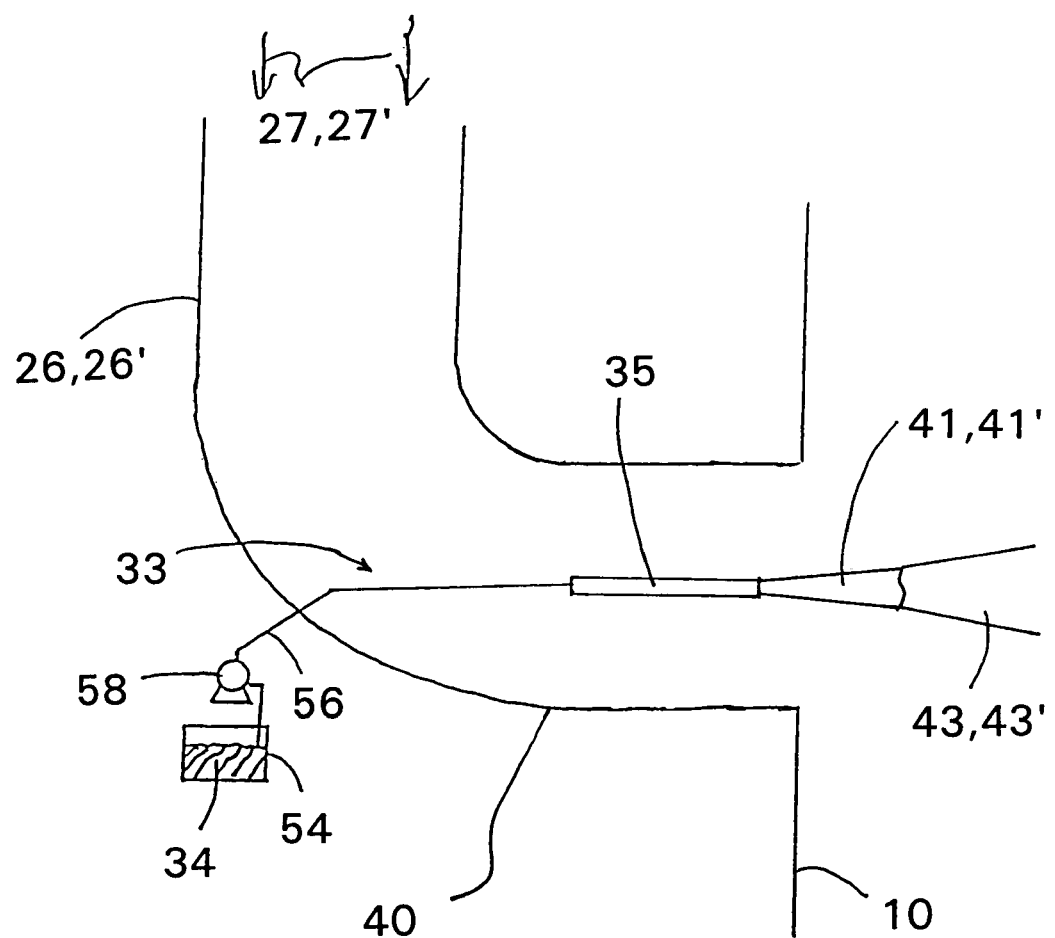
FIG. 6 is a diagrammatic cross sectional view of an improved combustion boiler, according to the present invention, having a high energy injector port.

A reducing agent injection device 33 (FIG. 6) has a spray nozzle 35 which is located within the primary SNCR duct 26 and a supply end of the reducing agent injection device 33 is connected to a reducing agent supply source 54 by a reducing agent conduit 56 and a supply pump 58. The supply pump 58 draws the reducing agent 34 from the reducing agent supply source 54, via the reducing agent conduit 56, and conveys the reducing agent 34 to the spray nozzle 35 of the reducing agent injection device 33. The spray nozzle 35 then sprays a very fine mist 41 of the reducing agent 34 directly into the primary SNCR stream 27 passing therethrough. The sprayed reducing agent is of a very fine mist 41 generally having a particle size of between 1 microns and 40 microns or more preferably having a particle size of between 15 microns and 35 microns. As shown in FIG. 2A, the injection device 33 preferably has a spray discharge angle a ranging from about 60° to about 140°. This very small particle size in combination with the temperature of the primary SNCR stream 27 and the high energy of the overfire air stream allows for rapid evaporation of the reducing agent/water mixture to occur within about 0.01 to 0.05 seconds after the reducing agent/water mixture contacts the relatively high temperature air of the primary SNCR stream 27. The mixture of the vaporized or gaseous reducing agent 34 and the heated primary SNCR stream 27 is then discharged into the upper most region 24 of the primary combustion chamber 16 in a flue gas/reducing agent mixing zone 43. In a preferred form of the invention, the reducing agent 34 is added to the primary SNCR stream 27 so that the reducing agent 34 comprises, for example, generally about 1% to 25% of the primary SNCR stream 27 or more preferably about 2.5% to 7.5% of the primary SNCR stream 27.

The present invention, in addition, may include a plurality of secondary SNCR ducts 26' (see FIG. 4) which are equally spaced about a perimeter or periphery of the secondary combustion chamber 12 to supply addition air, e.g., oxygen, and a reducing agent 34 to the secondary combustion chamber 12 and further insure that there is ample supply of oxygen and the reducing agent in the secondary combustion chamber 12 and further facilitate substantially full and complete consumption of all of the fuel 22 and reduction of the byproducts prior to the byproducts being exhausted from the combustion boiler 2 by the exit section 18. The secondary SNCR stream 27' supplies additional air and the reducing agent 34 to insure maximum efficiency of the combustion boiler 2 as well as reduce the amount of unconsumed fuel 22 which may possibly be exhausted out through the exit section 18 of the combustion boiler 2. The secondary SNCR stream 27' encases and envelopes the byproducts as they flow into the secondary combustion chamber 12. The secondary SNCR stream 27' flows at a rate of typically between 50 to 200 ft/sec, depending on the depth of the boiler, and is typically designed to envelope the combustion byproducts as well as any residual fuel 22 and further assist with substantially full and complete combustion of all of the fuel 22 and reduction of the byproducts prior to the combustion byproducts being exhausted out through the exit section 18 of the combustion boiler 2. The flow rate of the secondary SNCR stream 27' will also allow the reducing agent 34 to flow towards the rear wall and spread evenly with the rear third of the furnace. This distribution of reducing agent within the secondary SNCR stream 27' assists with maximum distribution of the reducing agent 34 within the furnace with a minimum number of injectors.

Preferably, the secondary SNCR stream 27' is supplied at an elevated temperature, e.g., at a temperature of between 300° and 800° F., or more preferably at a temperature of between 400° and 700° F., and at a relatively high velocity, e.g., at a velocity typcially ranging from about 50 to about 200 ft/sec. The high energy of the secondary SNCR stream 27' ensures that the reducing agent 34, added to the secondary SNCR stream 27', is evaporated and converted into a gaseous phase or state substantially instantaneously as the reducing agent 34 is mixed with the secondary SNCR stream 27' and enters into of the secondary combustion chamber 12 in a flue gas/reducing agent mixing zone 43'. A reducing agent injection device 33 has a spray nozzle 35 which is located within the secondary SNCR duct 26' and a supply end of the reducing agent injection device 33 is connected to the reducing agent supply source 54 by a second reducing agent conduit 56 and a second pump 58. The second pump 58 pumps the reducing agent 34 from the reducing agent supply source 54 to the spray nozzle 35 of the reducing agent injection device 33, via the second reducing agent conduit 56. The spray nozzle 35 then sprays a very fine mist 41' of the reducing agent 34 directly into the secondary SNCR stream 27' passing therethrough. The sprayed reducing agent 34 in the very fine mist 41' generally has a particle size of between 1 microns and 40 microns or more preferably has a particle size of between 15 microns to 35 microns. The injection device 33 preferably has a spray discharge angle a ranging from about 60° to about 140° (FIG. 2A). The fine mist of the liquid reducing agent 34 is substantially instantaneously gasified or vaporized as soon as it contacts the relatively high temperature secondary SNOR stream 27'. That is, the particle size in combination with the temperature of the secondary SNCR stream 27' and high energy of the overfire air stream allows for evaporation of the reducing agent/water mixture to occur within about 0.01 to 0.05 seconds after the reducing agent contacts the relatively high temperature secondary SNCR stream 27'. The mixture of the vaporized or gaseous reducing agent 34 and the heated secondary SNCR stream 27' is then discharged into the secondary combustion chamber 12 in the flue gas/reducing agent mixing zone 43'. In a preferred form of the invention, the reducing agent 34 is added to the secondary SNCR stream 27' so that the reducing agent 34 comprises, for example, generally about 1% to about 25% of the secondary SNCR stream 27'.

One difference between the present invention and the prior art systems heretofore available is that an initial overfire air stream 31 (see FIG. 5) is provided and this initial overfire air stream 31 is supplied between the fuel supply ducts 20 and the primary SNCR ducts 26. The initial overfire air stream 31 can be divided into several distinct overfire air streams, namely, an initial primary overfire air stream 30 and an initial secondary overfire air stream 32. The initial primary overfire air stream 30 is similar to conventional prior art overfire air streams as it is merely a source of additional air or oxygen designed to surround, encase and envelope a central area of a lower region of the primary combustion chamber 16 of the combustion boiler 2 which contains the consumed fuel emitted by the one or more fuel supply ducts 20. The initial secondary overfire air stream 32, on the other hand, contains a gaseous or vaporized reducing agent 34 therein and the initial secondary overfire air stream 32 is emitted and designed to surround, encase and envelope both the initial primary overfire air stream 30 and the consumer fuel 22 emitted by the one or more fuel supply ducts 20.

To facilitate dividing or partitioning the overfire air stream into the initial primary and initial secondary overfire air stream streams 30, 32, the discharged outlet 36 of the at least one, preferably all, of the initial overfire air supply ducts 39 has a discharge nozzle 40 (see FIG. 5) which has an internal wall, surface or some other internal dividing or partitioning member 42 that physically and aerodynamically divides the interior space of the discharge nozzle 40 into a larger primary flow passage 44 and a smaller secondary flow passage 46. Preferably, the entire initial overfire air stream is divided such that greater than 50 percent of the initial overfire air stream 31, supplied by the initial overfire air duct 39 to the discharge nozzle 40, is channeled or diverted and forms the initial primary overfire air stream 30 while the remainder of the initial overfire air stream 31 supplied by the initial overfire air duct 39 to the discharge nozzle 40, i.e., less than 50 percent of the initial overfire air stream 31, is channeled or diverted and forms the initial secondary overfire air stream 32.

It is to be appreciated that the initial overfire air stream 31, prior to reaching the discharge nozzle 40, is typically a single stream of air. Preferably, the overfire air, supplied by the initial overfire air supply duct 39, flows at a rate of between 50 to 200 ft/sec, depending on the depth of the boiler, and is at an elevated temperature, e.g., at a temperature of between about 300° and 800° F., and more preferably at a temperature of between about 400° and 700° F. or so, and the high energy of the overfire air stream ensures that the reducing agent 34, added to the initial secondary overfire air stream 32, is converted into a gaseous phase or state substantially instantaneously as the reducing agent 34 is mixed with the initial secondary overfire air stream 32 and enters into mid region 25 of the primary combustion chamber 16 of the combustion boiler 2. The flow rate of the initial overfire air stream 31 will also allow the reducing agent added to the initial secondary overfire air stream 32 to flow towards the back wall and spread evenly to the back third of the furnace. This distribution of reducing agent within the initial secondary overfire air stream 32 will allow for maximum distribution within the furnace with a minimum number of injectors.

A reducing agent injection device 52 has a spray nozzle 50 (see FIG. 5) which is located within the secondary flow passage 46 of the discharge nozzle 40 and a supply end of the reducing agent injection device 52 is connected to a reducing agent supply source 54 by a reducing agent conduit 56 and a pump 58. The pump 58 pumps the reducing agent 34 from the reducing agent supply source 54, via the reducing agent conduit 56, to the spray nozzle 50 of the reducing agent injection device 52. The spray nozzle 50 then sprays a very fine mist of the reducing agent 34 directly into the initial secondary overfire air stream 32 passing through the secondary flow passage 46 of the discharge nozzle 40. The sprayed reducing agent in the very fine mist generally has a particle size of between 1 microns and 40 microns or more preferably has a particle size of between 15 microns and 35 microns. The injection device 52 preferably has a spray discharge angle a ranging from about 60° to about 140°. The fine mist of the liquid reducing agent 34 is substantially instantaneously gasified or vaporized as soon as it contacts the relatively high temperature initial secondary overfire air stream 32. The mixture of the vaporized or gaseous reducing agent 34 and the heated initial secondary overfire air stream 32 is then discharged from the secondary flow passage 46 of the discharge nozzle 40 into mid region 25 of the primary combustion chamber 16 where the initial secondary overfire air stream 32 surrounds, encases and envelops the primary overfire air stream 30. Preferably, the outlet of the secondary flow passage 46 of the discharge nozzle 40 has an upwardly inclined or directed deflector 60 which is designed to deflect or direct the initial secondary overfire air stream 32, as it enters the combustion boiler 2, toward an upper region of the primary combustion chamber 16.

The particle size of the reducing agent in combination with the temperature and the high energy of the initial secondary overfire air stream 32 allows for rapid evaporation of the reducing agent/water mixture to occur within about 0.01 to 0.05 seconds after the reducing agent contacts the relatively high temperature initial secondary overfire air stream 32. As soon as the mixture of the vaporized or gaseous reducing agent 34 and the heated initial secondary overfire air stream 32 enters into the combustion boiler 2, the vaporized or gaseous reducing agent 34 is then permitted to disperse and intermix with the nitrogen oxides and reduce the nitrogen oxides to relatively harmless components, such as $N_2$ and $H_2O$, which can then be discharged or exhausted into the atmosphere. In one form of the invention, the reducing agent 34 is added to the initial secondary overfire air stream 32 so that the reducing agent 34 comprises, for example, generally about 0.1% to about 1% of the initial secondary overfire air stream 32.

During operation of the combustion boiler 2, the fuel 22 is supplied by the fuel supply ducts 20 to the interior combustion chamber of the combustion boiler 2 where the fuel 22 readily ignites and combusts into its conventional combustion byproducts. The combustion byproducts, resulting from combustion of the fuel 22, rise within the primary combustion chamber 16 and intermixes with the initial primary overfire air stream 30 which generally surrounds and encases the burning fuel. Any remaining uncombusted or unconsumed fuel 22 then intermixes with the initial primary overfire air stream 30 and the oxygen contained therein facilitates further combustion of any remaining fuel as this fuel flows toward the exit section 18 of the combustion boiler 2. The additional air of the initial primary overfire air stream 30 substantially ensures complete combustion of all of the supplied fuel 22 prior to the combustion byproducts exiting via the exit section 18 of the combustion boiler 2.

The combustion byproducts of the fuel continue to flow toward the throat of the combustion boiler 2 and as such combustion byproducts flow toward the exit section 18, they intermix with the initial secondary overfire air stream 32 which is designed to completely surround, encase and envelope both the initial primary overfire air stream 30 as well as the fuel 22 located generally in the mid region 25 of the combustion boiler 2. As the combustion byproducts, resulting from the combustion process of the fuel 22, flow toward the exit section 18 of the combustion boiler 2, the combustion byproducts intermix with the initial secondary overfire air stream 32. As this intermixing occurs, the gaseous or vaporized reducing agent 34 contained in the initial secondary overfire air stream is permitted to react with the nitrogen oxides and reduce the nitrogen oxides into $N_2$ and $H_2O$.

It is to be appreciated that within the combustion boiler 2, the regions or boundary between the combustion zone and the initial primary overfire air stream 30 or between the primary overfire air stream 30 and the secondary overfire air region 32 are not well defined and tend to move, vary or overlap somewhat during operation of the combustion boiler 2. Those regions or zones are described with this specification merely to help facilitate understanding of the present invention.

As the combustion byproducts, the initial primary overfire air stream, the initial secondary overfire air stream and the primary combustion chamber overfire air stream all flow toward the exit section 18 of the combustion boiler 2, these streams and byproducts are all accelerated due to the constriction formed by the throat of the combustion boiler 2. This acceleration of the combustion byproducts and the initial overfire air streams 30, 32 and the primary combustion chamber overfire air stream 27 facilitates a more thorough and complete mixing of the overfire air streams and the combustion byproducts and assists with further reducing the nitrogen oxides. The constriction formed by the throat of the combustion boiler 2 accelerates the overfire air streams 30, 32, the primary combustion chamber overfire air stream 27 and the combustion byproducts toward the top wall 8 of the combustion boiler 2 where the flow path of the streams and the combustion byproducts impinge against and turn sharply prior to exiting the combustion boiler 2 through the exit section 18. The secondary combustion chamber 12 facilitates intimate mixing of all of the sources of the overfire air streams, any remaining fuel, the combustion byproducts and any remaining reducing agent 34 to assist with minimizing the amount of nitrogen oxides which is exhausted out through the discharge port of the combustion boiler 2.

Field testing of the above method and apparatus has found increased reduction in $NO_x$. A known 50 MW coal fired front wall fired boiler, injecting large droplets of reducing agent/water mixture through three front wall overfire ports resulted in only a 9% reduction in the $NO_x$ emissions. However, by utilizing the method and apparatus of the present invention, which produces reducing agent droplet sizes of about 25 microns, the smaller droplets were more rapidly and quickly evaporated and/or vaporized and this, in turn, led to a 30% reduction in the $NO_x$ emissions. The inventors have discovered that by evaporating, vaporizing and/or gasifying the reducing agent droplets quickly, upon mixing with the SNCR stream, such rapid evaporation results in better distribution of reducing agent within the furnace and this leads to a more complete reduction in the generate nitrogen oxides.

In another example, with a 180 MW coal fired front wall fired boiler, the rapid vaporization and expansion of the reducing agent facilitates an improved dispersion of the reducing agent within the overfire air steam which, in turn, greatly increases the dispersion and coverage of the reducing agent within the combustion boiler. This rapid vaporization and expansion of the reducing agent facilitates an improved and more complete intermixing of the reducing agent within the overfire air steam which, in turn, leads to an improved and more complete intermixing of the reducing agent, contained within the overfire air steam, with the combustion gases located in the combustion boiler. That is, since the volume of the reducing agent increase sooner and more rapidly than any other conventional method or apparatus, e.g., within the overfire air duct and/or immediately upon entering the combustion boiler, and this leads to a more complete intermixing of the reducing agent with the combustion gases and a reduction in the $NO_x$ emissions. The above exemplifies the importance of vaporizing or evaporating the reducing agent droplets in the SNCR stream to increase the coverage area within the combustion boiler and increase the reduction in the $NO_x$ emissions.

An important aspect of the present invention relates to spraying or dispensing the reducing agent in a fine mist or small enough particle size, e.g., from about 1 to about 40 microns in size, so that the liquified reducing agent is substantially instantaneously vaporized, either prior to or immediately after entering into the combustion boiler and the additional overfire air facilitates conveying or transferring this vaporized reducing agent and mixing with the nitrous oxide to convert the same to water and carbon dioxide, for example. The inventors believe that it is a combination of generating sufficiently small reducing agent droplets which can substantially instantaneously vaporize and thus are readily able to intimately mix and react with the nitrous oxide that results in the increase in the amount of nitrous oxide removed from the exhaust stream prior to exhausting the same from the boiler.

The inventors believe that three factors are important in order to facilitate intimate mixing of the reducing agent with the nitrogen oxides contained within the combustion boiler. Firstly, the reducing agent must be substantially in vaporized form, either prior to or immediately after entering the combustion boiler, i.e., the reducing agent must be in a gaseous or vaporized state either before entering the combustion boiler or within about 0.1 second after the reducing agent enters the combustion boiler. Secondly, the reducing agent must be of a sufficient concentration so that the reducing agent is readily available to react with the nitrogen oxides contained within the combustion boiler while not being of an excess concentration so that some of the reducing agent is unable to react with the nitrogen oxides, contained within the combustion boiler, prior to being exiting from the combustion boiler. That is, the reducing agent should constitute a concentration of between about 3 percent and about 5 percent of the overfire air stream. Thirdly, the reducing agent must be sprayed from a nozzle having a dispersion angle of preferably between 60 degrees and 140 degrees. The inventors have determined that if the spray angle is excessive, e.g., over 140 degrees, for example, the concentration of the reducing agent within the overfire air stream is sufficiently diluted and thus leads to less reduction of the nitrogen oxides compounds. Alternatively, if the nozzle dispensing angle is less than about 60 degrees, the concentration of the reducing agent within the overfire air stream is too concentrated and a portion of the reducing agent may have a tendency to be exhausted from the combustion boiler without reacting with any of the nitrogen oxides contained within the combustion boiler.

Preferably, the reducing agent is directed at and supplied to a central region or area of the combustion boiler above the location where the fuel is supplied to the combustion boiler but below the throat of the combustion boiler. Preferably, the reducing agent is substantially completely evaporated/gasified by the time that the reducing agent is conveyed, by the overfire air stream, and reaches the rear wall of the combustion boiler and more preferably, the reducing agent is substantially completely evaporated/gasified by the time that the reducing agent is conveyed, by the overfire air stream, and reaches the central region of the combustion boiler. The addition of the reducing agent in the above noted concentration and area has a tendency to facilitate more intimate contact and complete mixing of the reducing agent with the nitrogen oxides contained within the combustion boiler and thereby achieves a maximum reduction in the nitrogen oxides contained in the exhaust stream.

As used in the above description and the appended claims, the term "vaporize" is used interchangeable with the terms "evaporate" and/or "gasify". These terms all mean that the reducing agent is rapidly converted into a gaseous phase or state substantially instantaneously once the reducing agent is mixed with the overfire air stream or, at the very latest, substantially immediately after the reducing agent entering into the combustion boiler, i.e., prior to the reducing agent contacting or reaching the rear wall of the combustion boiler.

The discharge outlet of the spray nozzle, for spraying the very fine mist of reducing agent, is typically located closely adjacent the interface between the overfire air duct and the wall of the combustion boiler, e.g., within a few inches to a few feet of the interface.

Since certain changes may be made in the above described method of improving reduction in the amount of nitrogen oxides discharged into the atmosphere from a combustion boiler and a combustion boiler for achieving the same, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and spraying the reducing agent into the overfire air stream at a discharge angle of between about 60° to about 140°.

2. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and spraying the reducing agent into the overfire air stream such that a concentration of the reducing agent within the overfire air stream is between about 3 to about 5 percent.

3. The method of claim according to claim 2, further comprising the step of using one of ammonia, ammonia salts, urea and urea prills as the reducing agent.

4. The method according to claim 2, further comprising the steps of supplying a cooling fluid to a wall of the combustion boiler to absorb and remove heat generated within the combustion chamber, and utilizing the heated fluid to drive a steam turbine and generate electricity.

5. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and dividing at least one initial overfire air duct, for supplying an initial overfire air stream to the combustion boiler and facilitate substantially complete combustion of fuel supplied to the combustion boiler, into an initial primary overfire air stream and an initial secondary initial overfire air stream, and adding the reducing agent only to the initial secondary initial overfire air stream, but not the initial primary initial overfire air stream, prior to the secondary initial overfire air stream discharging into the combustion chamber.

6. The method according to claim 5, further comprising the step of using at least 50 percent of the initial overfire air stream, supplied by the at least one initial overfire air duct, to form the initial primary overfire air stream and using a remainder of the initial overfire air stream, supplied by the at least one initial overfire air duct, to form the secondary initial overfire air stream.

7. The method according to claim 5, further comprising the step of providing a reducing agent injection nozzle in the initial secondary overfire air stream for injecting the reducing agent, in liquid form, into the initial secondary air stream and vaporizing the reducing agent prior to the initial secondary overfire air stream entering the combustion chamber.

8. The method according to claim 5, further comprising the step of heating the initial overfire air stream to a temperature of between 300 and 800 degrees F prior to the initial overfire air stream being divided into the primary and the secondary initial overfire air streams.

9. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and spacing a plurality of primary combustion chamber overfire air ducts about a periphery of the combustion boiler for supplying addition air to a mid region of the primary combustion chamber and facilitating a substantially complete consumption of fuel supplied by at least one fuel supply duct to the combustion boiler.

10. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and forming the reducing agent by mixing one of ammonia, ammonia salts, urea and urea prills with water in a ratio of about 3% to 15% of one of ammonia, ammonia salts, urea and urea prills with about 85% to 97% of water.

11. The method according to claim 10, further comprising the step of spraying the reducing agent to have a particle size of between 1 micron and 40 microns.

12. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and adding the reducing agent to the overfire air stream such that the reducing agent comprises generally about 1% to 25% of the overfire air stream.

13. A method of minimizing discharge of nitrogen oxides from a combustion boiler, the method comprising the steps of:

spraying a reducing agent into an overfire air stream;

supplying the overfire air stream with the sprayed reducing agent to the combustion boiler;

vaporizing the sprayed reducing agent at least within about 0.1 seconds of the sprayed reducing agent entering the combustion boiler;

reacting the vaporized reducing agent with the nitrogen oxides within the combustion chamber to reduce the nitrogen oxides and minimize discharge of nitrogen oxides from the combustion boiler; and adding the reducing agent to the overfire air stream such that the reducing agent comprises generally about 2.5% to 7.5% of the overfire air stream.

14. A combustion boiler for combustion of fuel and generating heat, the combustion boiler comprising:

a housing defining an internal combustion chamber therein;

at least one fuel supply duct connected to the combustion boiler for supplying fuel to the combustion chamber; and at least one initial overfire air duct for supplying an initial overfire air stream to the combustion chamber to facilitate complete combustion of the fuel supplied to the combustion boiler;

wherein the at least one initial overfire air duct is divided into an initial primary overfire air stream and an initial secondary initial overfire air stream, and a reducing agent is added only to the initial secondary initial overfire air stream, but not the initial primary initial overfire air stream, prior to the secondary initial overfire air stream discharging into the combustion chamber; and the housing comprises a base wall, a sidewall and a top wall with an exit section formed in the sidewall adjacent the top wall, and an indentation is formed in the sidewall of the housing to form a throat which accelerates combustion byproducts and the over-fire air and any residual reducing agent as the combustion byproducts, the overfire air and any residual reducing agent flow from a primary combustion chamber toward a secondary combustion chamber located above the indentation in the combustion boiler.

15. The combustion boiler according to claim 14, wherein the reducing agent injection nozzle has a discharge spray angle of between about 60° to about 140° and a plurality of fuel supply ducts supply fuel to the combustion chamber where the fuel ignites and is consumed upon operation of the combustion boiler.

16. A combustion boiler for combustion of fuel and generating heat, the combustion boiler comprising:

a housing defining an internal combustion chamber therein;

at least one fuel supply duct connected to the combustion boiler for supplying fuel to the combustion chamber; and at least one initial overfire air duct for supplying an initial overfire air stream to the combustion chamber to facilitate complete combustion of the fuel supplied to the combustion boiler;

wherein the at least one initial overfire air duct is divided into an initial primary overfire air stream and an initial secondary initial overfire air stream, and a reducing agent is added only to the initial secondary initial overfire air stream, but not the initial primary initial overfire air stream, prior to the secondary initial overfire air stream discharging into the combustion chamber; and the reducing agent added to the initial secondary initial overfire air stream is selected from the group comprising ammonia, ammonia salts, urea and urea prills.

17. A combustion boiler for combustion of fuel and generating heat, the combustion boiler comprising:

a housing defining an internal combustion chamber therein;

at least one fuel supply duct connected to the combustion boiler for supplying fuel to the combustion chamber; and at least one initial overfire air duct for supplying an initial overfire air stream to the combustion chamber to facilitate complete combustion of the fuel supplied to the combustion boiler;

wherein the at least one initial overfire air duct is divided into an initial primary overfire air stream and an initial secondary initial overfire air stream, and a reducing agent is added only to the initial secondary initial overfire air stream, but not the initial primary initial overfire air stream, prior to the secondary initial overfire air stream discharging into the combustion chamber; and the initial overfire air stream is heated to a temperature of between 300 and 800 degrees F. prior to the initial overfire air stream being divided into the primary and the secondary initial overfire air streams.

18. A combustion boiler for combustion of fuel and generating heat, the combustion boiler comprising:

a housing defining an internal combustion chamber therein:

at least one fuel supply duct connected to the combustion boiler for supplying fuel to the combustion chamber; and at least one initial overfire air duct for supplying an initial overfire air stream to the combustion chamber to facilitate complete combustion of the fuel supplied to the combustion boiler;

wherein the at least one initial overfire air duct is divided into an initial primary overfire air stream and an initial secondary initial overfire air stream, and a reducing agent is added only to the initial secondary initial overfire air stream, but not the initial primary initial overfire air stream, prior to the secondary initial overfire air stream discharging into the combustion chamber;

the housing comprises a base wall, a sidewall and a top wall with an exit section formed in the sidewall adjacent the top wall, and an indentation is formed in the sidewall of the housing to form a throat which accelerates combustion byproducts and the overfire air and any residual reducing agent as the combustion byproducts, the overfire air and any residual reducing agent flow from a primary combustion chamber toward a secondary combustion chamber located above the indentation in the combustion boiler;

the reducing agent added to the initial secondary initial overfire air stream is selected from the group comprising ammonia, ammonia salts, urea and urea prills;

the reducing agent injection nozzle has a discharge spray angle of between about 60° to about 140° and a plurality of fuel supply ducts supply fuel to the combustion chamber where the fuel ignites and is consumed upon operation of the combustion boiler; and the initial overfire air stream is heated to a temperature of between 300 and 800 degrees F. prior to the initial overfire air stream being divided into the primary and the secondary initial overfire air streams.

* * * * *